US009106122B2

(12) United States Patent
Fahimi

(10) Patent No.: US 9,106,122 B2
(45) Date of Patent: Aug. 11, 2015

(54) SINGLE PHASE SWITCHED RELUCTANCE MACHINE WITH SHORT FLUX PATH

(71) Applicant: Everette Energy, LLC, Dallas, TX (US)

(72) Inventor: Babak Fahimi, Arlington, TX (US)

(73) Assignee: Everette Energy, LLC, Dallas, TX (US)

( * ) Notice: Subject to any disclaimer, the term of this patent is extended or adjusted under 35 U.S.C. 154(b) by 224 days.

(21) Appl. No.: 13/928,595

(22) Filed: Jun. 27, 2013

(65) Prior Publication Data

US 2014/0210285 A1 Jul. 31, 2014

Related U.S. Application Data

(60) Provisional application No. 61/756,984, filed on Jan. 25, 2013.

(51) Int. Cl.
*H02K 1/06* (2006.01)
*H02K 19/06* (2006.01)

(52) U.S. Cl.
CPC .................................... *H02K 19/06* (2013.01)

(58) Field of Classification Search
USPC .......... 310/166, 168, 179, 184, 198, 216.075, 310/254.1, 701
See application file for complete search history.

(56) References Cited

U.S. PATENT DOCUMENTS 4,584,513 A 4/1986 Freise et al.
4,661,756 A 4/1987 Murphy et al.
4,684,867 A 8/1987 Miller et al.
4,698,537 A 10/1987 Byrne et al.
4,737,674 A 4/1988 Miyao
4,804,873 A 2/1989 Shiraki et al.
4,995,159 A 2/1991 Hancock et al.
5,811,905 A 9/1998 Tang
6,002,222 A * 12/1999 Turner ...................... 318/254.1
6,008,561 A * 12/1999 Tang ............................ 310/183
6,037,740 A * 3/2000 Pollock et al. ............... 318/701
6,051,942 A 4/2000 French
6,075,302 A 6/2000 McCleer
6,166,500 A * 12/2000 Makaran ................. 318/400.22

(Continued)

FOREIGN PATENT DOCUMENTS

EP 0814558 A2 12/1997
JP 10098861 A 4/1998

(Continued)

OTHER PUBLICATIONS

Michael T. Direnzo “Switched Reluctance Motor Control—Basic Operation and Example Using the TMS320F240,” Digital Signal Processing Solutions, Application Report SPRA420A—Feb. 2000, Copyright 2000, Texas Instruments Incorporated.

(Continued)

*Primary Examiner* — Thanh Lam
(74) *Attorney, Agent, or Firm* — Gardere Wynne Sewell LLP; Andre M. Szuwalski

(57) ABSTRACT

A reluctance machine includes a stator having N stator poles and a rotor having N rotor poles. Each stator pole has a stator winding, and the windings of the N stator poles are configured for excitation in a single phase. The current flow in the windings is controlled to support a constrained flux path across two air gaps provided by circumferentially adjacent rotor/stator pole pairs. The rotor may further be structurally configured to support that constrained flux path and preclude diagonal flux across the rotor.

17 Claims, 16 Drawing Sheets

(56) References Cited

U.S. PATENT DOCUMENTS

| | | | | |
|---|---|---|---|---|
| 6,252,325 | B1 * | 6/2001 | Nashiki | 310/168 |
| 6,442,535 | B1 * | 8/2002 | Yifan | 706/4 |
| 6,578,649 | B1 | 6/2003 | Shimasaki et al. | |
| 6,646,406 | B1 * | 11/2003 | Pollock et al. | 318/599 |
| 6,700,348 | B2 | 3/2004 | Lim | |
| 6,731,083 | B2 * | 5/2004 | Marcinkiewicz | 318/254.2 |
| 6,922,036 | B1 * | 7/2005 | Ehsani et al. | 318/701 |
| 7,081,725 | B2 | 7/2006 | Seely et al. | |
| 7,271,564 | B2 | 9/2007 | Ramu | |
| 7,291,945 | B2 | 11/2007 | Nashiki | |
| 7,427,845 | B2 | 9/2008 | Burse | |
| 7,583,000 | B2 | 9/2009 | Durham et al. | |
| 7,633,172 | B2 | 12/2009 | Kalev et al. | |
| 7,781,931 | B2 | 8/2010 | Ishikawa et al. | |
| 2004/0263013 | A1 | 12/2004 | Ramu et al. | |
| 2008/0197793 | A1 | 8/2008 | Randall | |
| 2008/0234096 | A1 | 9/2008 | Joshi et al. | |
| 2008/0258572 | A1 | 10/2008 | Koehler | |
| 2008/0272664 | A1 | 11/2008 | Flynn | |
| 2008/0278010 | A1 | 11/2008 | Ishikawa et al. | |
| 2009/0021192 | A1 | 1/2009 | Kudligi | |
| 2009/0072676 | A1 | 3/2009 | Johnson et al. | |
| 2009/0108712 | A1 | 4/2009 | Holtzapple et al. | |
| 2010/0141061 | A1 | 6/2010 | Ramu et al. | |
| 2011/0316366 | A1 | 12/2011 | Abbasian et al. | |

FOREIGN PATENT DOCUMENTS

| | | |
|---|---|---|
| JP | 2000062471 A | 2/2000 |
| KR | 10-2006-0032814 | 4/2006 |
| WO | WO-2012030460 A2 | 3/2012 |

OTHER PUBLICATIONS

M. M. Mahmoud, J. E. Fletcher, B. W. Williams, School of Engineering and Physical Sciences, Heriot-Watt University, Riccarton, Edinburgh, Scotland, UK, "Evaluation of Rotor Conducting Screens on the Single-Phase Switched Reluctance Machine," Electric Power Components and Systems, 34:173-189, 2006, Copyright Taylor & Francis, LLC, ISSN: 1532-5008 print/1532-5016 online; DOI: 10.1080/15325000500244674.

Dr. A. Stassis, Higher Technical Institute, Dr. A. M. Michaelides, Electricity Authority Cyprus, "The Design of Low Vibration Doubly Salient Motors," Electric Machines and Power Systems, 27:967-981, 1999, Copyright 1999 Taylor & Francis, Inc., 0731-356X.

Sang-Hun Lee, Feel-Soon Kang, Sung-Jun Park, Su Eog Cho, Man Hyung Lee, "Single-Stage Power-Factor-Corrected Converter for Switched Reluctance Motor Drive," Science Direct, Electric Power Systems Research 76 (2006) 534-540.

S. Chan, H. R. Bolton, "Performance Enhancement of Single-Phase Switched-Reluctance Motor by DC Link Voltage Boosting," IEE Proceedings-B, vol. 140, No. 5, Sep. 1991, pp. 316-322.

Jawad Faiz, B. Rezaeealam, and P. Pillay, "Adaptive Performance Improvement of Switched Reluctance Motor With Two-Phase Excitation," European Transactions on Electrical Power 2006: 16:1-13, published online Apr. 11, 2005 in Wiley InterScience (www.interscience.wiley.com). DOI: 10.1002/etep.61.

Mi-Ching Tsai, Chien-Chin Huang, Zheng-Yi Huang, "A New Two-Phase Homopolar Switched Reluctance Motor for Electric Vehicle Applications," Science Direct, Journal of Magnetism and Magnetic Materials 267 (2003) 173-181.

J. C. Compter, Philips Research Laboratories, Eindhoven, The Netherlands, "Microprocessor-Controlled Single-Phase Reluctance Motor," Proceedings of the Conference on Drives/Motors/Controls 84, Oct. 24-26, 1984, Brighton, pp. 64-68.

J. D. Lewis, H. R. Bolton, N. W. Phillips, Cardiff School of Engineering, University of Cardiff, Wales, UK, "Performance Enhancement of Single and Two Phase SR Drives Using a Capacitor Boost Circuit," epe '95, 6th European Conference on Power Electronics and Applications, Sep. 19-21, 1995, Sevilla, Spain, published by EPE Association c/o VUB-TW, pp. 3.229-3.232.

Yoichi Hayashi and The Miller, "Single-Phase Multi-Pole SRM for Solar-Powered Vehicle," Proceedings of 1995 International Power Electronics Conference, IPEC-Yokohama '95, Apr. 3-7, 1995, Pacific Convention Plaza, Yokohama, Japan, sponsored by The Institute of Electrical Engineers of Japan, pp. 575-579.

Ferhat Daldaban, Nurettin Ustkoyuncu, "Multi-Layer Switched Reluctance Motor to Reduce Torque Ripple," Science Direct, Energy Conversion and Management 49 (2008) 974-979.

M. Crivii and M. Jufer, "Two-Phase Two-Stack SR Motor," Swiss Federal Institute of Technology, Leme, 1015 Lausanne, Switzerland, pp. 1670-1673.

E. Afjei, A Seyadatan, and H. Torkaman, Department of Electrical Engineering, Shahid Beheshti University, GC Tehran, Iran, "A New Two Phase Bidirectional Hybrid Switched Reluctance Motor/Field-Assisted Generator," Journal of Applied Sciences 9 (4): 765-770, 2009, ISSN 1812-5654, Copyright 2009 Asian Network for Scientific Information.

Tadashi Sawata, Associated Member, IEEE, Philip C. Kjaer, Member, IEEE, Calum Cossar, T. J. E. Miller, Fellow, IEEE, and Yoichi Hayashi, "Fault-Tolerant Operation of Single-Phase SR Generators," IEEE Transactions on Industry Applications, vol. 35, No. 4, Jul./Aug. 1999, pp. 774-781.

C. C. Chan, MSc, PhD, CEng, MIEE, "Single-Phase Switched Reluctance Motors," IEE Proceedings, vol. 134, Pt. B, No. 1, Jan. 1987, pp. 53-56.

Patrick C. K. Luk, Department of Aerospace, Power and Sensors, Cranfield University, Shrivenham, UK, and Ken P. Jinupun, Department of Aerospace, Power and Sensors, Cranfield University, Shrivenham, UK, "Direct Work Control for a Three-Stack Switched Reluctance Motor," Copyright 2005, IEEE, pp. 2462-2466.

Amanda Martin Staley, "Design and Implementation of a Novel Single-Phase Switched Reluctance Motor Drive System," Thesis submitted to the Faculty of the Virginia Polytechnic Institute and State University in partial fulfillment of the requirements for the degree of Master of Science in Eelctrical Engineeering, Aug. 21, 2001, Blacksurg, VA, Copyright 2001, Amanda Martin Staley, total of 88 pages.

Jun-Young Lim, Hyung-Sup Kim, Jae-Yoon Oh, Dal-Ho Cheong, Jung-Chul Kim, Power Electronics Team, living System Research Laboratory, LG Electronics Inc., "A Performance of Single Phase Switched Reluctance Motor Having Both Radial and Axial Air Gap," 327-23, Gasan-Dong, Keumchun-Gu, Seoul, 153-023, Korea, pp. 905-910.

English translation of the Abstract of JP 10098861 (A).

PCT Search Report and Written Opinion for PCT/US2011/046275 mailed Mar. 14, 2012 (12 pages).

Asgar, M., et al: "A Swappable Single Phase Switched Reluctance Motor with Bifilar Drive Converter," IEEE conference dated Feb. 15-16, 2012, pp. 261-265.

International Search Report and Written Opinion for PCT/US2014/013016 mailed May 19, 2014 (9 pages).

* cited by examiner

SINGLE PHASE SWITCHED RELUCTANCE MACHINE WITH SHORT FLUX PATH

PRIORITY CLAIM

This application claims priority from U.S. Provisional application for Patent No. 61/756,984 filed Jan. 25, 2013, the disclosure of which is incorporated by reference.

TECHNICAL FIELD

The present invention relates to switched reluctance machines of a single phase actuation type and, in particular, to a single phase switched reluctance machine configured to provide a constrained short flux path during single phase actuation.

BACKGROUND

Reluctance machines are well known in the art. These machines operate on the tendency of the machine's rotor to move to a position where the reluctance with respect to the stator is minimized (in other words, where the inductance is maximized). This position of minimized reluctance occurs where the rotor pole is aligned with an energized stator pole. When operated as a motor, energizing the stator pole generates a magnetic field attracting the closest rotor pole towards the stator pole. This magnetic attraction produces a torque causing the rotor to rotate and move towards the minimized reluctance position. Conversely, when operated as a generator, torque applied to the rotor is converted to electricity as the rotor pole moves away from the aligned position with respect to an energized stator pole.

The generation of magnetic flux requires electric current. The magnetization of a relatively larger are requires a relatively larger magnetization current. As the rotor moves, the magnetic flux varies. The existence of such a time varying magnetic flux initiates losses known in the art as "core loss" (eddy current loss and hysteretic loss). In order to minimize overall loss in a switched reluctance machine, it is desired to minimize the magnetized area of the rotor and stator cores. In a conventional switched reluctance machine, however, the design of the rotor and stator along with the design of the stator windings do not provide for an optimal magnetization pattern with respect to the core, and thus such a machine cannot achieve higher levels of efficiency. In this regard, the magnetic flux pattern in such prior art machines exhibits a characteristic long flux path which passes radially across the rotor between two simultaneously actuated stator poles and circumferentially around the stator back iron. While shorter flux paths may also be present from time to time as the rotor moves, it is the long flux path between the simultaneously actuated stator poles across the radius of the rotor which dominates the machine's efficiency calculation.

There is accordingly a need in the art for a switched reluctance machine that is configured to emphasize shorter magnetic flux paths.

SUMMARY

In an embodiment, a reluctance machine comprises: a stator having N stator poles, each stator pole having a stator winding; and a rotor having N rotor poles and configured to rotate about an axis of rotation; wherein the windings of the N stator poles are configured for excitation in a single phase; and wherein current in windings of two circumferentially adjacent stator poles is controlled such that axial current flow in the windings through a gap between the two circumferentially adjacent stator poles during single phase excitation flows in a same axial direction.

In an embodiment, a reluctance machine comprises: a first single phase reluctance machine; a second single phase reluctance machine stacked on said first single phase reluctance machine but angularly offset from said first single phase reluctance machine; wherein each of the first and second single phase reluctance machines comprises: a stator having N stator poles, each stator pole having a stator winding; and a rotor having N rotor poles and configured to rotate about an axis of rotation; wherein the windings of the N stator poles are configured for excitation in a single phase; and wherein current in two windings of circumferentially adjacent stator poles is controlled such that axial current flow in the two windings through a gap between the circumferentially adjacent stator poles during single phase excitation flows in a same axial direction; and wherein the stator and rotor support N/2 separate flux paths, each of said separate flux paths traveling in a plane perpendicular to the axis of rotation and crossing only two air gaps provided at corresponding pairs of rotor-stator poles that are circumferentially adjacent to each other.

In an embodiment, a reluctance machine comprises: a stator including a first stator pole and a circumferentially adjacent second stator pole; a first stator winding for the first stator pole; a second stator winding for the second stator pole; wherein the first and second stator windings are electrically connected to be activated in a single phase; a rotor including a first rotor pole and a circumferentially adjacent second rotor pole; said stator and rotor supporting an isolated flux path that travels radially along the first stator pole, crosses a first air gap to the first rotor pole, travels radially along that first rotor pole, then travels circumferentially in the rotor to the second rotor pole, then travels radially along the second rotor pole, crosses a second air gap to the second stator pole, then travels radially along the second stator pole, and then travels circumferentially in the stator back to the first stator pole.

BRIEF DESCRIPTION OF THE DRAWINGS

A more complete understanding of the present invention may be obtained by reference to accompanying Detailed Description considered in relation to the accompanying Drawings wherein.

DETAILED DESCRIPTION OF THE DRAWINGS

Figure 1:
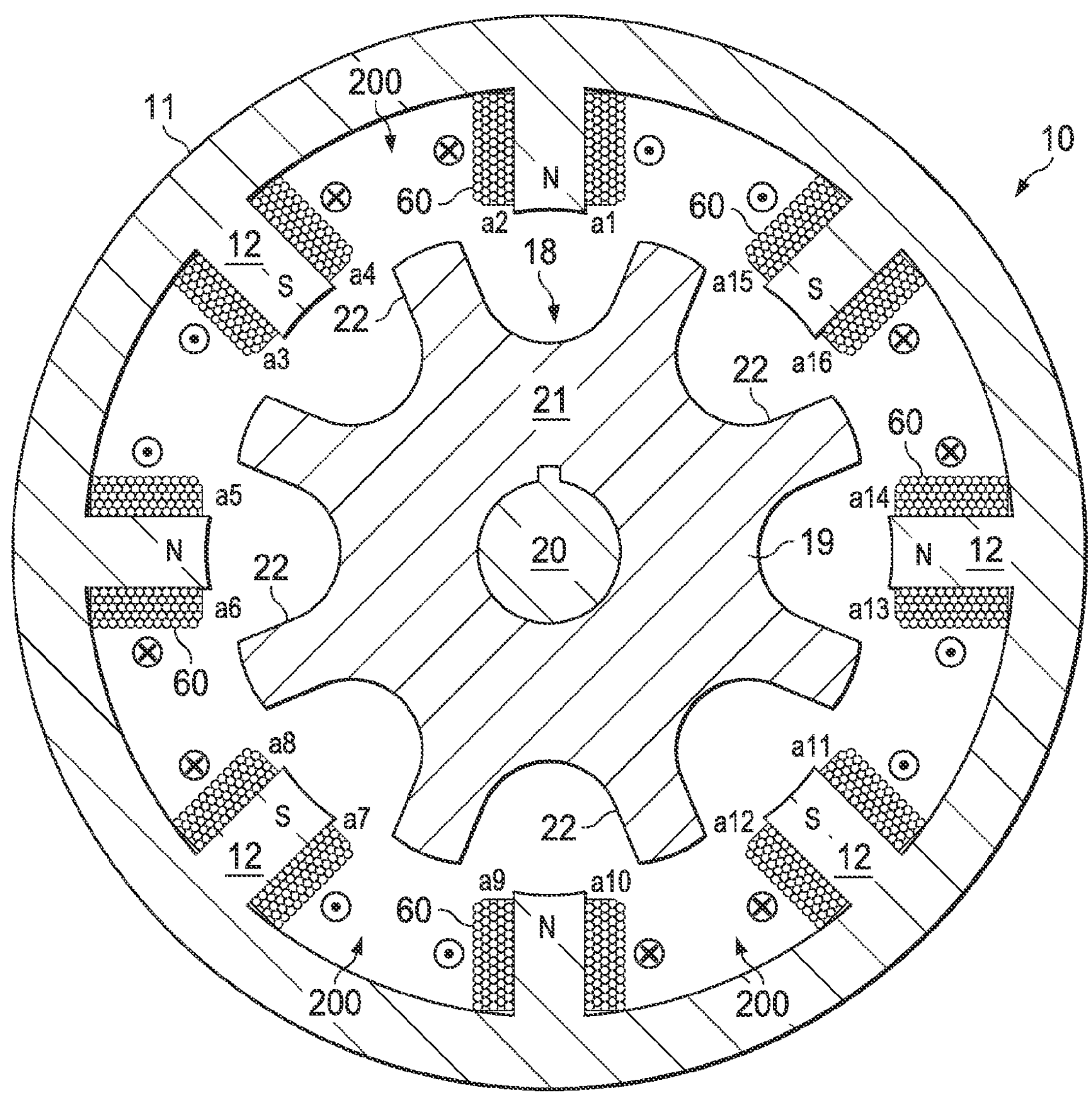
FIG. 1 illustrates a cross-section of an exemplary single phase switched reluctance machine.

Reference is now made to FIG. 1 which illustrates a cross-section of an exemplary single phase switched reluctance machine of the 8/8 topology. The reference to "8/8" indicates that the machine has eight rotor poles and eight stator poles. The reference to "single-phase" indicates that there is only one stator energizing phase, and thus each of the eight windings on the stator are energized simultaneously.

The stator 10 includes eight poles 12. In an embodiment, the stator is formed of a circular ring 11 and the poles 12 are circumferentially evenly spaced about and extend radially inwardly from the stator ring 11.

The rotor 18 is configured to be mounted to a shaft 20 (illustrated schematically only), and the shaft is supported by a housing and bearings (not shown but well known to those skilled in the art) that allow for rotational movement of the rotor relative to the stator 10.

The rotor 18 also includes eight poles 22. In an embodiment, the rotor 18 is formed from a circular ring 19 and the poles 22 are circumferentially evenly spaced about and radially extend outwardly from the rotor ring 19. A disc-like support structure 21 is provided to support the rotor ring 19 and includes a keyed opening configured couple to the shaft 20.

Other configurations for supporting the rotor poles 22 relative to the shaft 20 may be provided as known to those skilled in the art.

It will be understood that the illustrated 8/8 topology is exemplary only and that the single phase switched reluctance machine may have any desired even number of poles. In other words, the single phase switched reluctance machine may have an N/N topology, where N is an even integer (preferably greater than or equal to 4), and the machine has N rotor poles and N stator poles.

Figure 2:
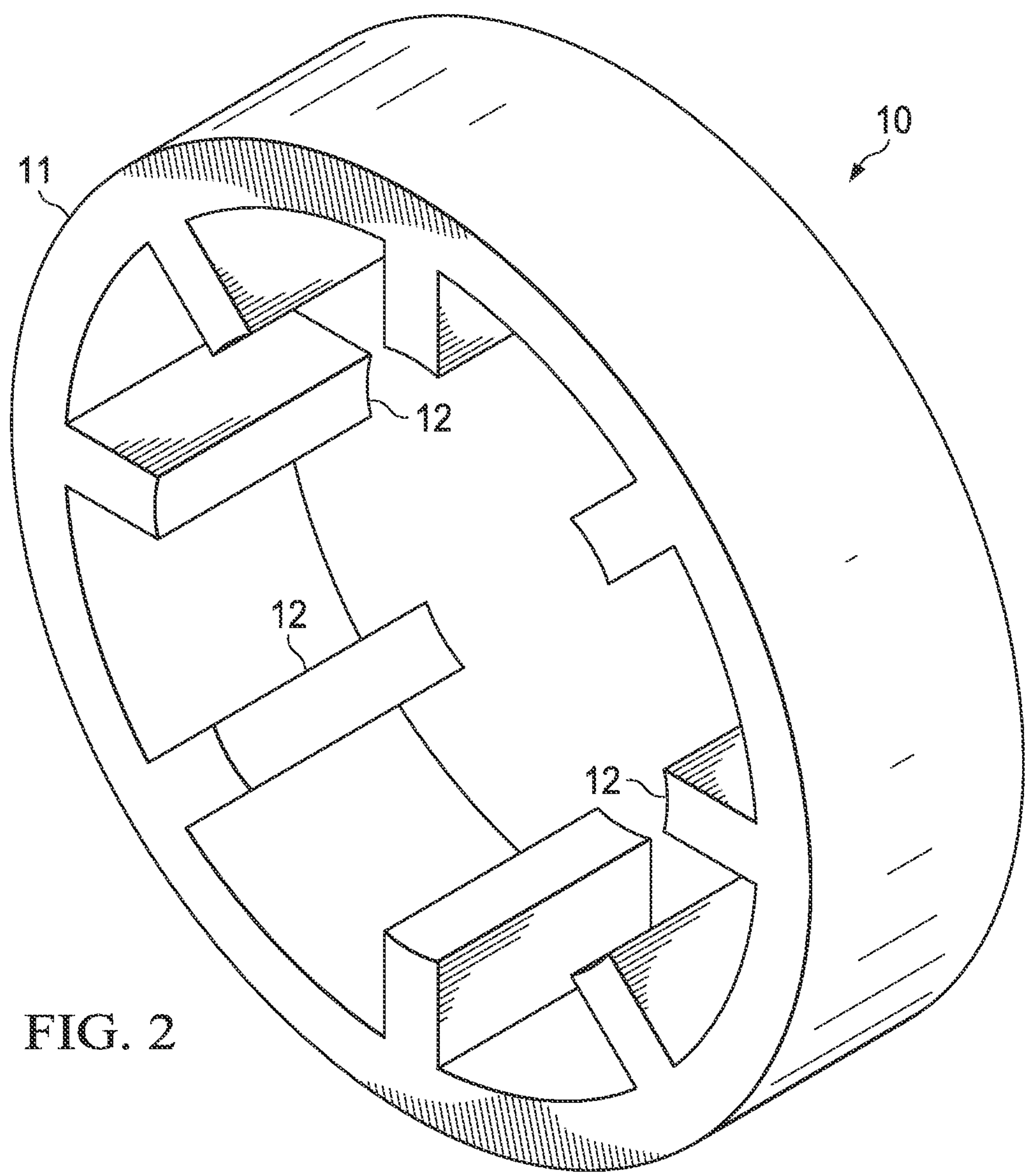
FIG. 2 illustrates a perspective view of the stator.

FIG. 2 illustrates a perspective view of the stator 10. The stator is formed of a plurality of metal laminations, wherein each metal lamination has a plan view configuration as shown in FIG. 1 and comprises an outer ring member (associated with forming the stator ring 11) and a plurality of inwardly radially projecting members (associated with forming the stator poles 12). The plurality of metal laminations are stacked on each other, with the laminations extending coplanar and perpendicular to the axis of rotor rotation, and with the edges of the outer ring members aligned and further with the edges of the inwardly radially projecting members aligned.

Figure 3:
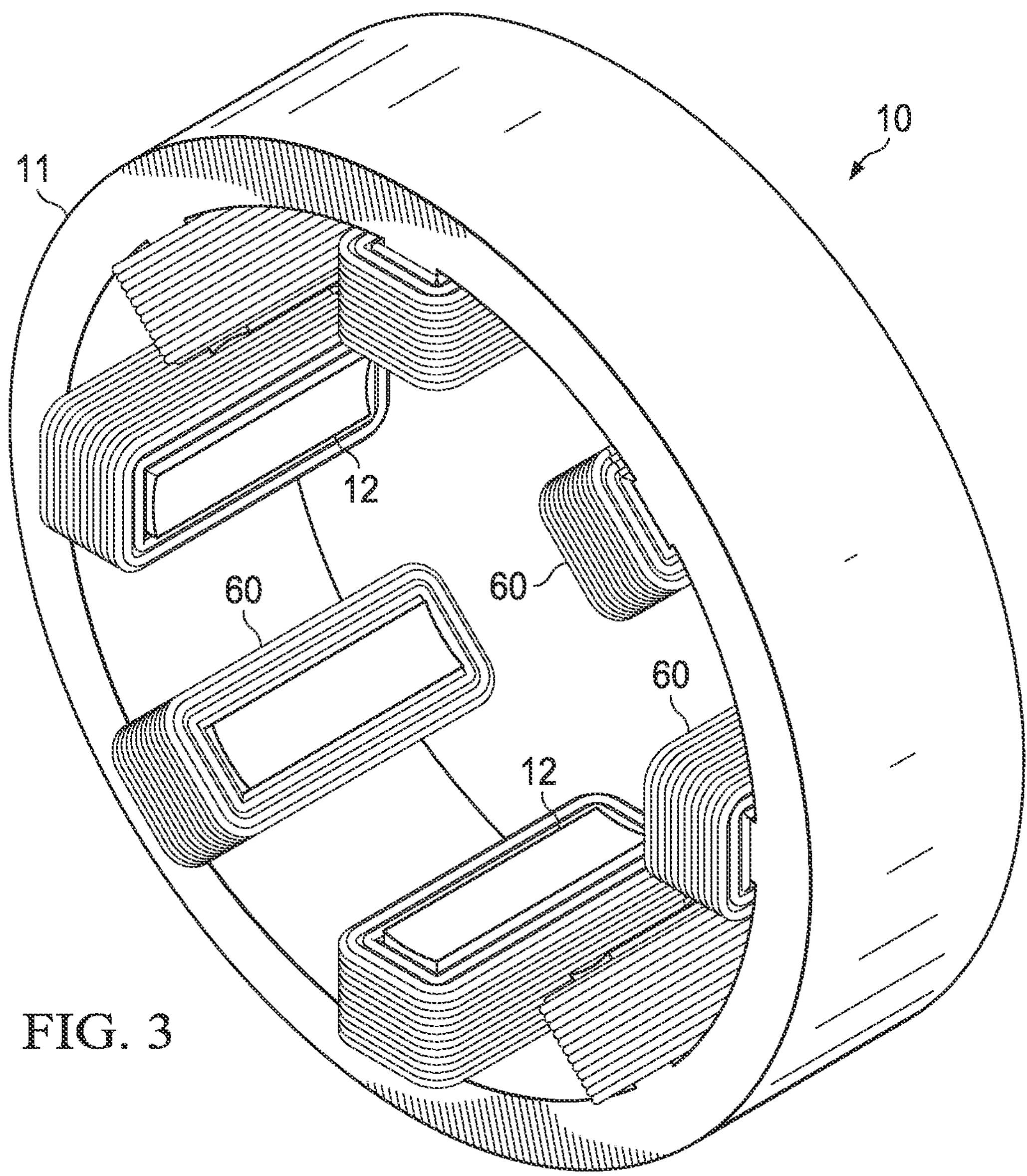
FIG. 3 illustrates a perspective view of the stator with windings installed.

FIGS. 1 and 3 illustrate that each stator pole 12 includes a winding 60. The current flow in each winding 60 is indicated using the "x" and "•" nomenclature as known by those skilled in the art. It will be noted that the current flows for circumferentially adjacent stator poles 12 are opposite (so that the magnetic orientation of the stator poles (when actuated in a single actuation phase) alternates /S-N-S-N-S-N-S-N/ around the circumference of the stator 10). It will further be noted that the direction of axial current flow through the gap 200 between adjacent stator poles is always the same (i.e., with respect to a given gap 200, the current flow in a winding for one stator pole and the current flow in a winding for the adjacent stator pole have a same axial direction). So, each gap 200 is associated with two windings having the same "x" or "•" nomenclature.

The individual windings 60 are identified by their respective terminals. For example, one winding includes terminals a1 and a2, while its adjacent winding includes terminals a3 and a4, and so until the last winding is reached including terminals a15 and a16.

Figure 4A:
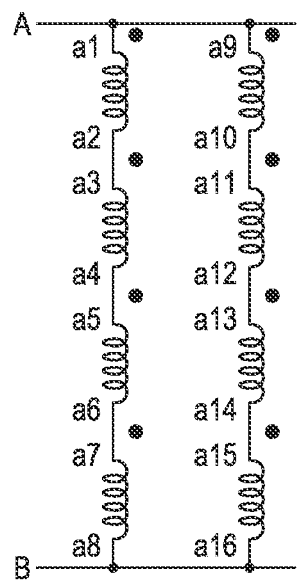
FIGS. 4A and 4B illustrate embodiments for electrically connecting the windings.

In one embodiment shown in FIG. 4A, one half of the windings 60 (associated with terminals a1-a8) are connected in series (with proper orientation to achieve the desired north/south poles), the other half of the windings (associated with terminals a9-a16) are connected in series (with proper orientation to achieve the desired north/south poles), and the two series connected circuits are connected in parallel between a first node A and second node B. The windings 60 electrically connected in this manner form a phase circuit (also referred to as a phase) and those windings 60 are simultaneously activated.

Figure 4B:
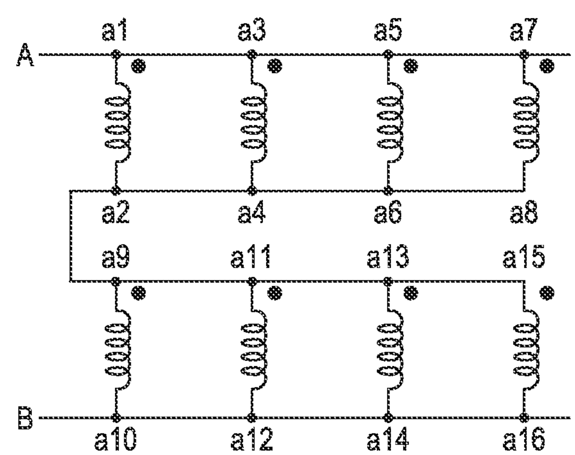

In another embodiment shown in FIG. 4B, one half of the windings 60 (associated with terminals a1-a8) are connected in parallel (with proper orientation to achieve the desired north/south poles), the other half of the windings (associated with terminals a9-a16) are connected in parallel (with proper orientation to achieve the desired north/south poles), and the two parallel connected circuits are connected in series between a first node A and second node B. The windings 60 electrically connected in this manner form a phase circuit (also referred to as a phase) and those windings 60 are simultaneously activated.

Other circuit connections for the windings 60 may be made including all windings in parallel, all windings in series, adjacent pairs of windings in series (with the pairs connected in parallel) or adjacent pairs of windings in parallel (with the pairs connected in series). In any such electrical connection of windings 60, the windings form a phase circuit (also referred to as a phase) and those windings 60 are simultaneously activated.

Figure 5:
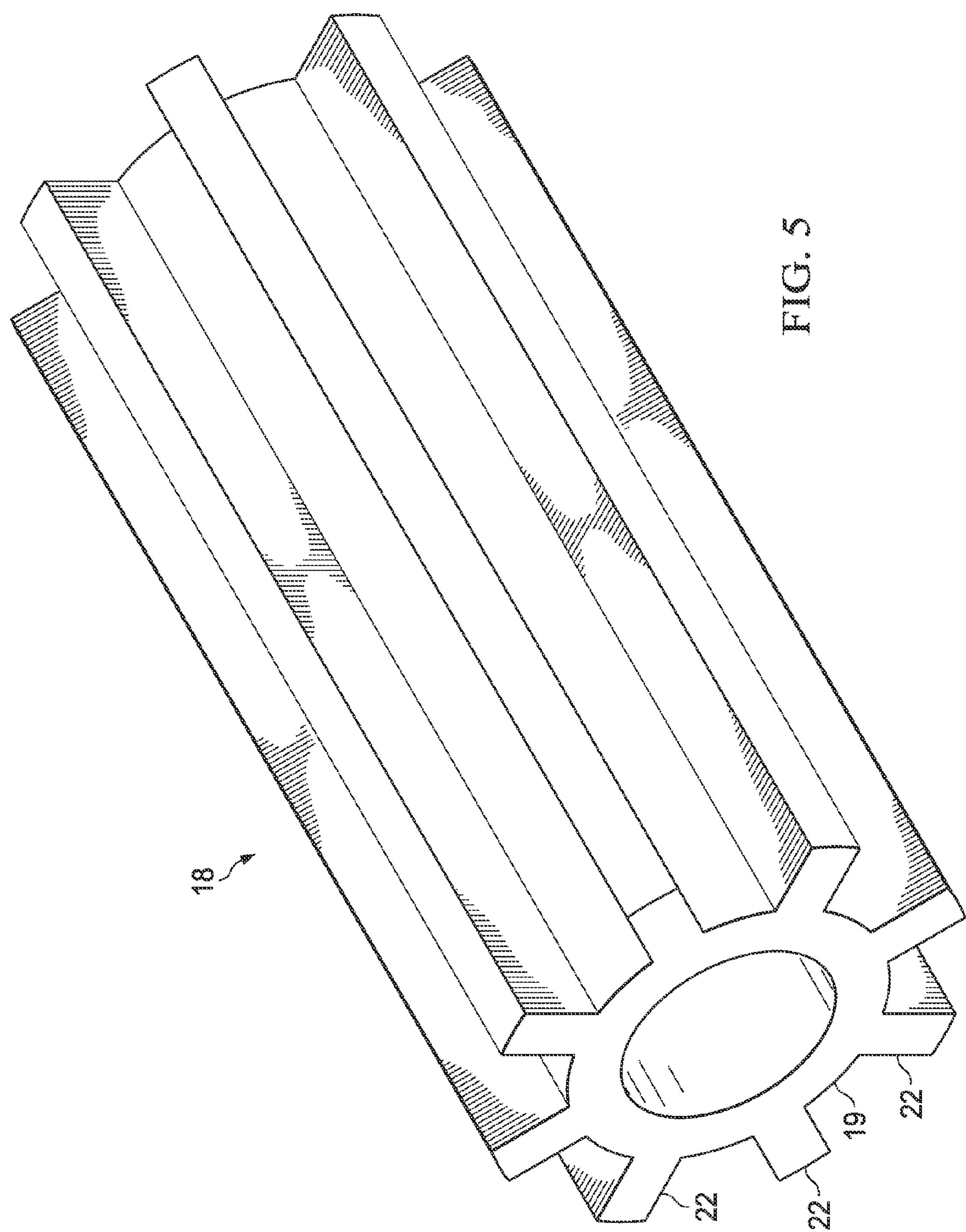
FIG. 5 illustrates a perspective view of the rotor.

FIG. 5 illustrates a perspective view of the rotor 18. The rotor is formed of a plurality of metal laminations, wherein each metal lamination has a plan view configuration as shown in FIG. 1 and comprises an inner ring member (associated with forming the rotor ring 19) and a plurality of outwardly radially projecting members (associated with forming the rotor poles 22). The plurality of metal laminations are stacked on each other, with the laminations extending coplanar and perpendicular to the axis of rotor rotation, and with the edges of the inner ring members aligned and further with the edges of the outwardly radially projecting members aligned. The rotor shaft 20 is connected to the stacked rotor laminations in any manner known to those skilled in the art.

The machine as shown in FIGS. 1-5, when configured as a motor, is not self-starting because the rotor could stop rotating at a position where the rotor poles were aligned with the stator poles (the minimized reluctance position). To address this issue, the motor of FIGS. 1-5 could further include a parking magnet which attracts the rotor poles to a position offset from the stator poles and from which starting is possible. Alternatively, the rotor poles could be shaped with a configuration that permits self-starting from any rotor position including when aligned with the stator poles. Parking magnet and self-starting rotor pole shape solutions are well known to those skilled in the art.

Figure 6:
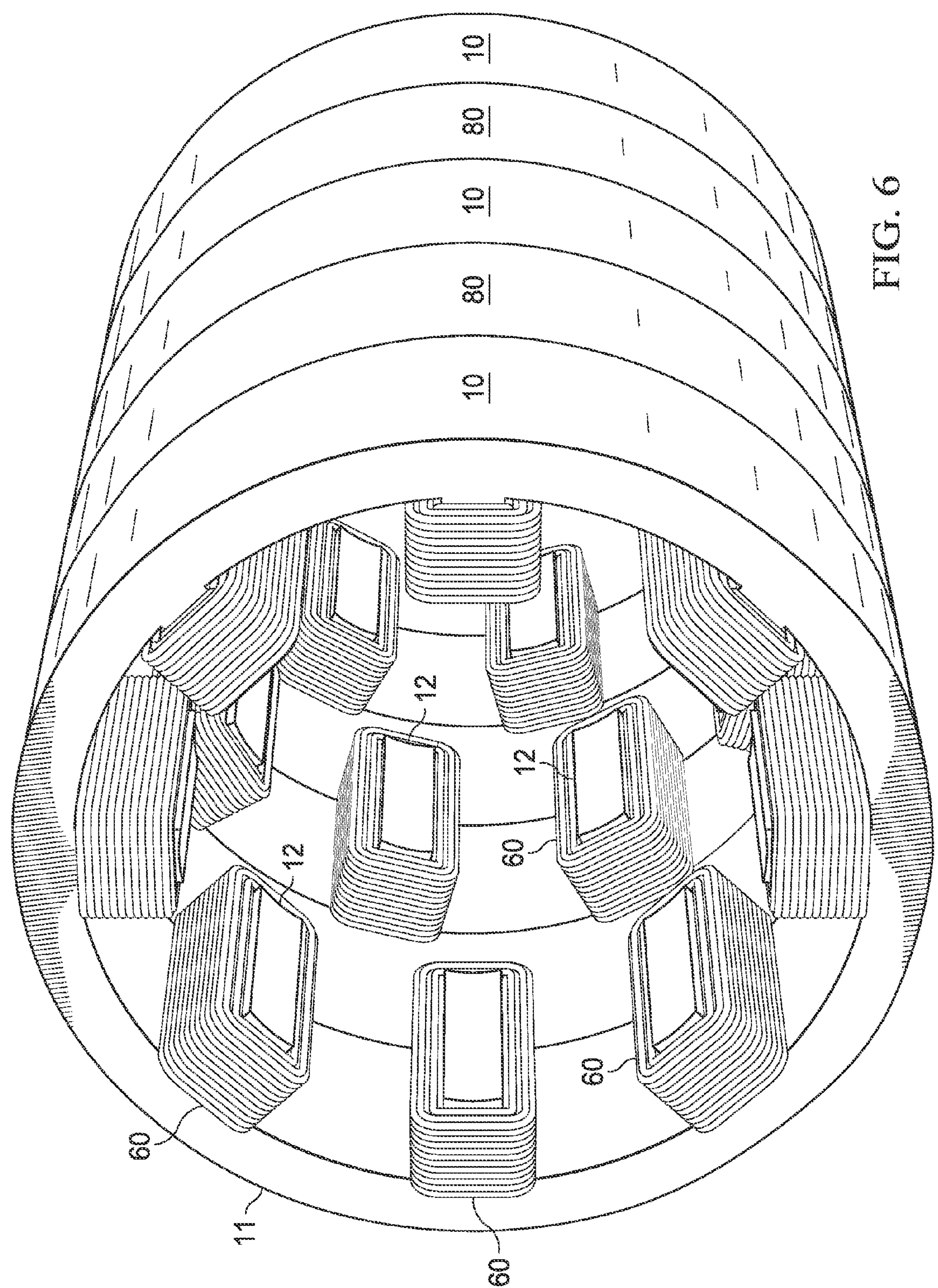
FIG. 6 illustrates a perspective view of multiple stators in a stacked configuration.
Figure 6A:
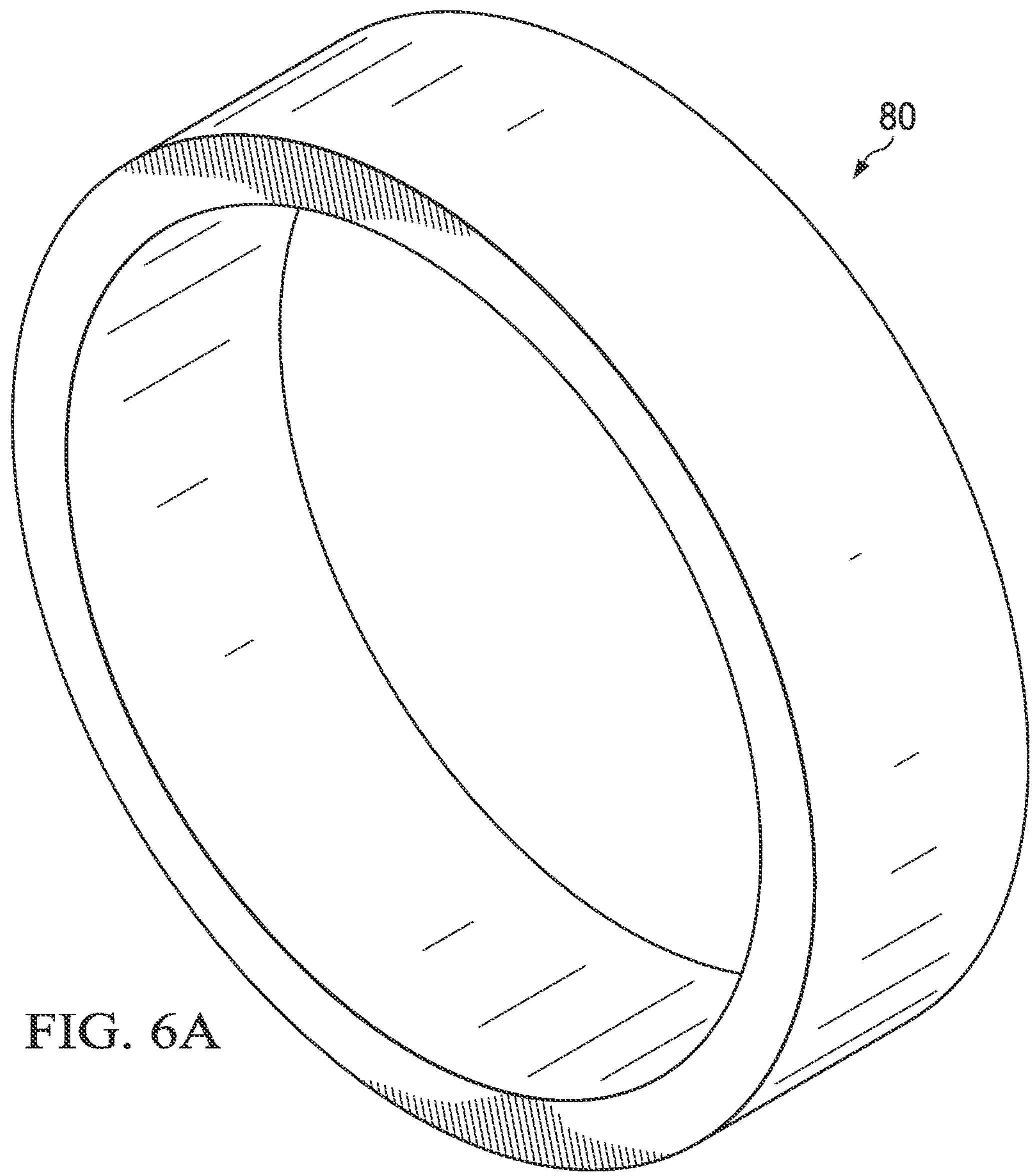
FIG. 6A illustrates a perspective view of a stack spacer.

Reference is now made to FIG. 6. In a further embodiment, multiple switched reluctance machines (one such machine as is shown in FIGS. 1-5) can be stacked on a common shaft. Each machine in the stack is a single phase machine, meaning that the stator windings of that single phase machine are simultaneously activated, but individual single phase machines will be actuated in distinct phases. The stators of the stacked machines are separated by spacer rings 80. FIG. 6A illustrates a spacer ring 80 which may be a laminated or non-laminated structure. It will be understood that the spacer ring 80 does not need to be made of metal. By angularly offsetting stators of the multiple machines from each other (as shown), the stacked machine presents a motor configuration that is self-starting because the rotor poles of at least one of the machines will be sufficiently offset from the stator poles to allow for magnetic attraction and torque generation. For example, the angular offset could be introduced by angularly offsetting the stator poles and keeping the rotor poles in alignment. Alternatively, the angular offset could be introduced by angularly offsetting the rotor poles and keeping the stator poles in alignment. An angular offset of 360/(M*N) degrees between each of the included machines is acceptable (when M is the number of machines in the stack). In a preferred implementation, the angular offset may, for example, comprise 10-25 degrees.

It will be noted that the rotor 18 illustrated in FIG. 3 is substantially longer than the stator illustrated in FIG. 2. The rotor of FIG. 3 is illustrated for use in the stacked machine configuration shown in FIG. 6. It will be understood that for a single stator like that shown in FIG. 2, the rotor will be shorter than the illustration and at least equally as long as the stator.

Figure 7A:
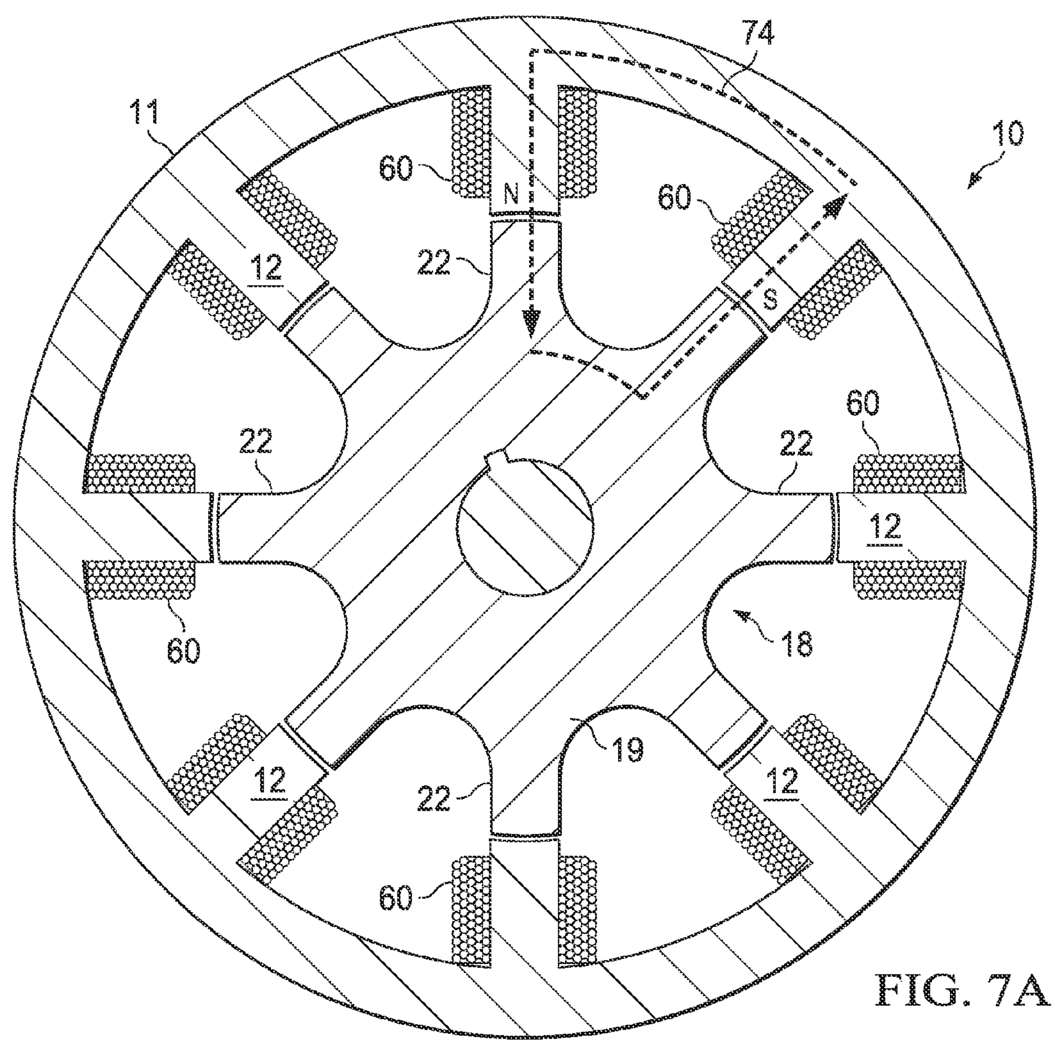
FIG. 7A illustrates the short flux path for the machine of FIG. 1.

Reference is now made to FIG. 7A which illustrates the flux path 74 for machine operation. In this illustration, the rotor has rotated into a position approaching alignment of the rotor-stator poles. The single phase switched reluctance machine is accordingly a two air gap machine and the flux path is a short flux path that is constrained by the stator and rotor laminations as well as the alternating orientation of the stator poles. Thus, the flux path travels radially along one stator pole, crosses a first air gap to the rotor pole, travels radially along that rotor pole, then travels circumferentially along the rotor ring to another rotor pole, travels radially along the another rotor pole, crosses a second air gap to another stator pole, then travels radially along the another stator pole then travels circumferentially along the stator ring back to said one stator pole. Advantageously, the flux path does not extend diagonally across the rotor (i.e., the long flux path) as is common in many switched reluctance machines.

Figure 7B:
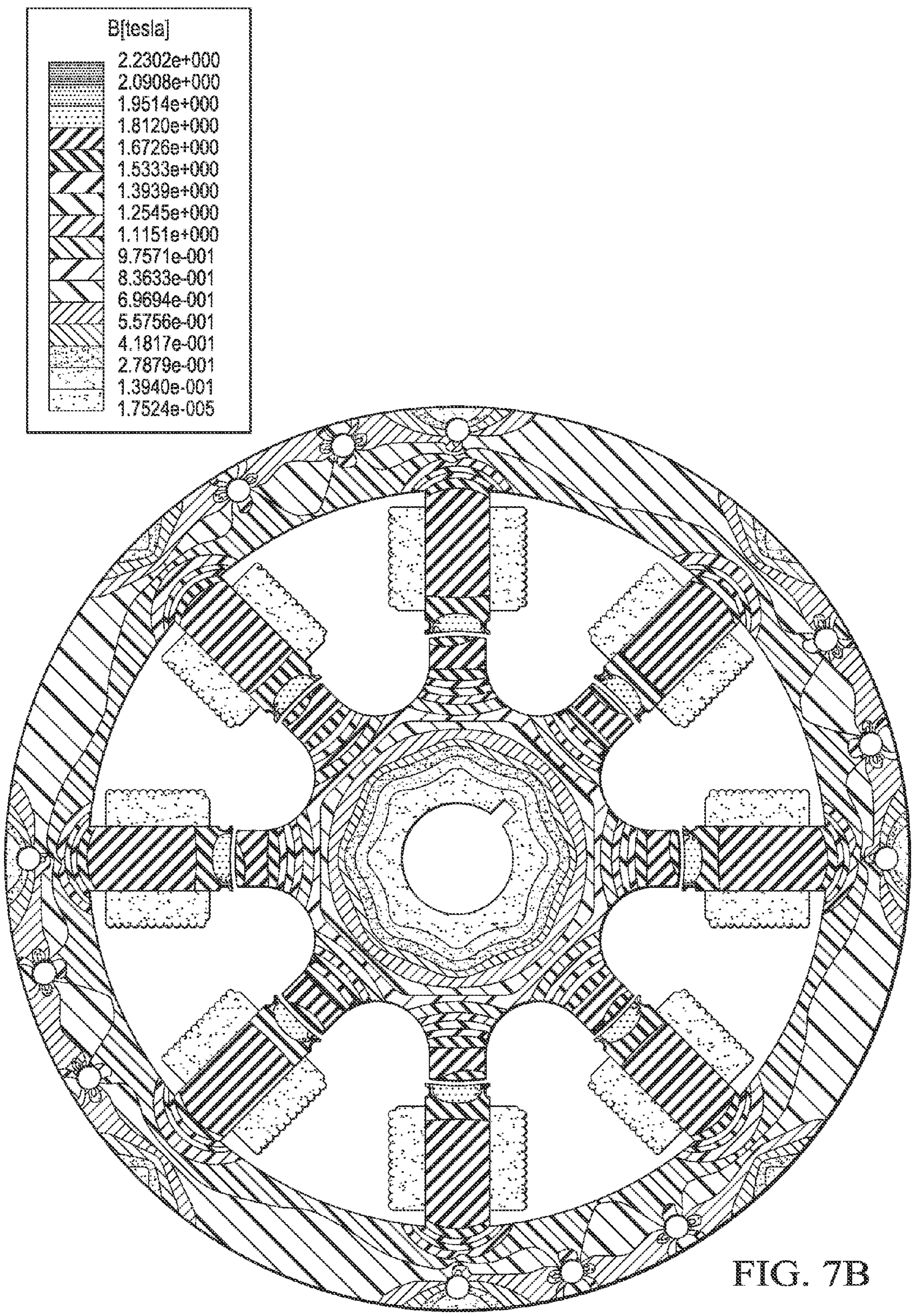
FIGS. 7B-7D illustrate flux density distribution for the machine of FIG. 1 at different rotor positions.
Figure 7C:
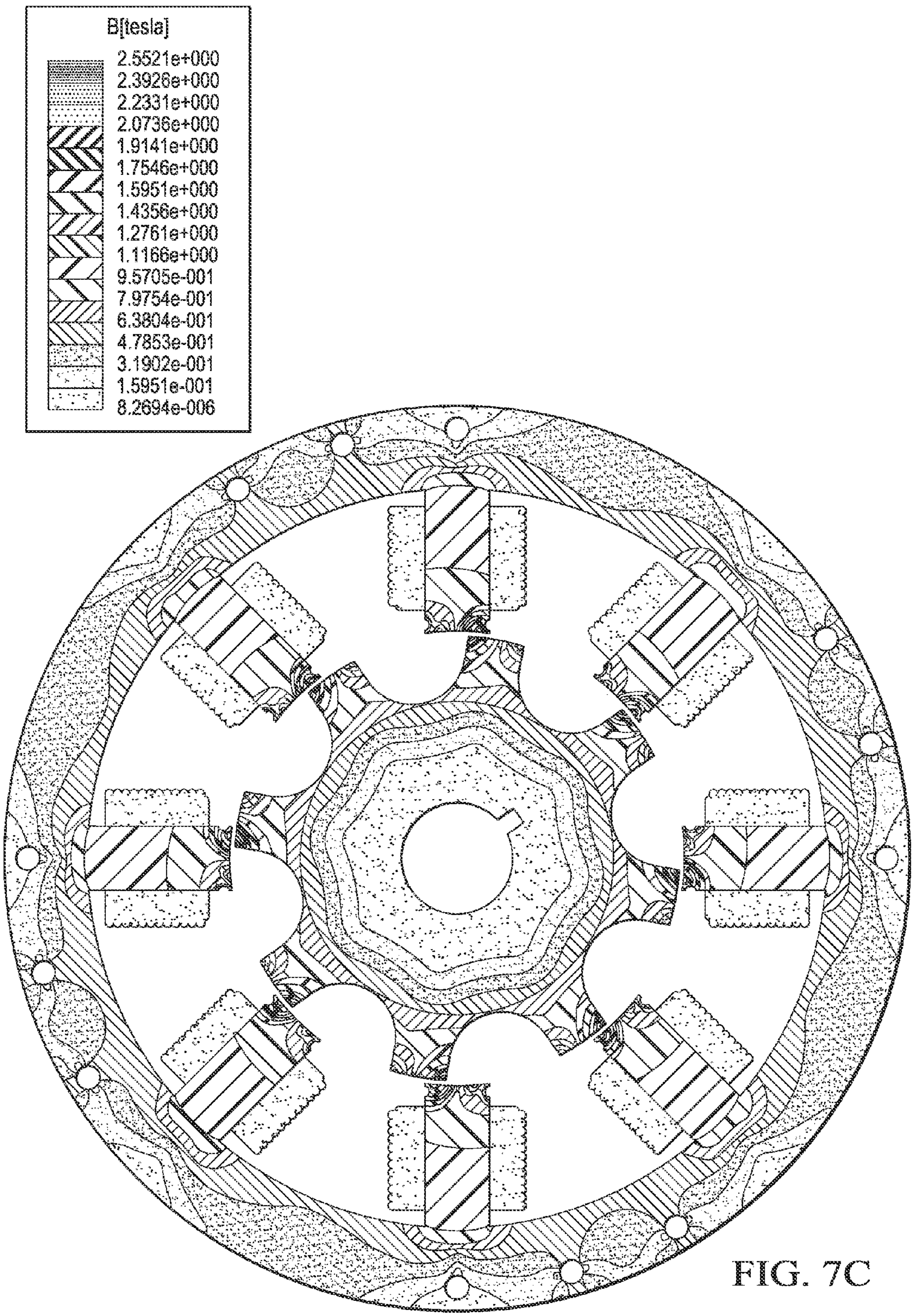
Figure 7D:
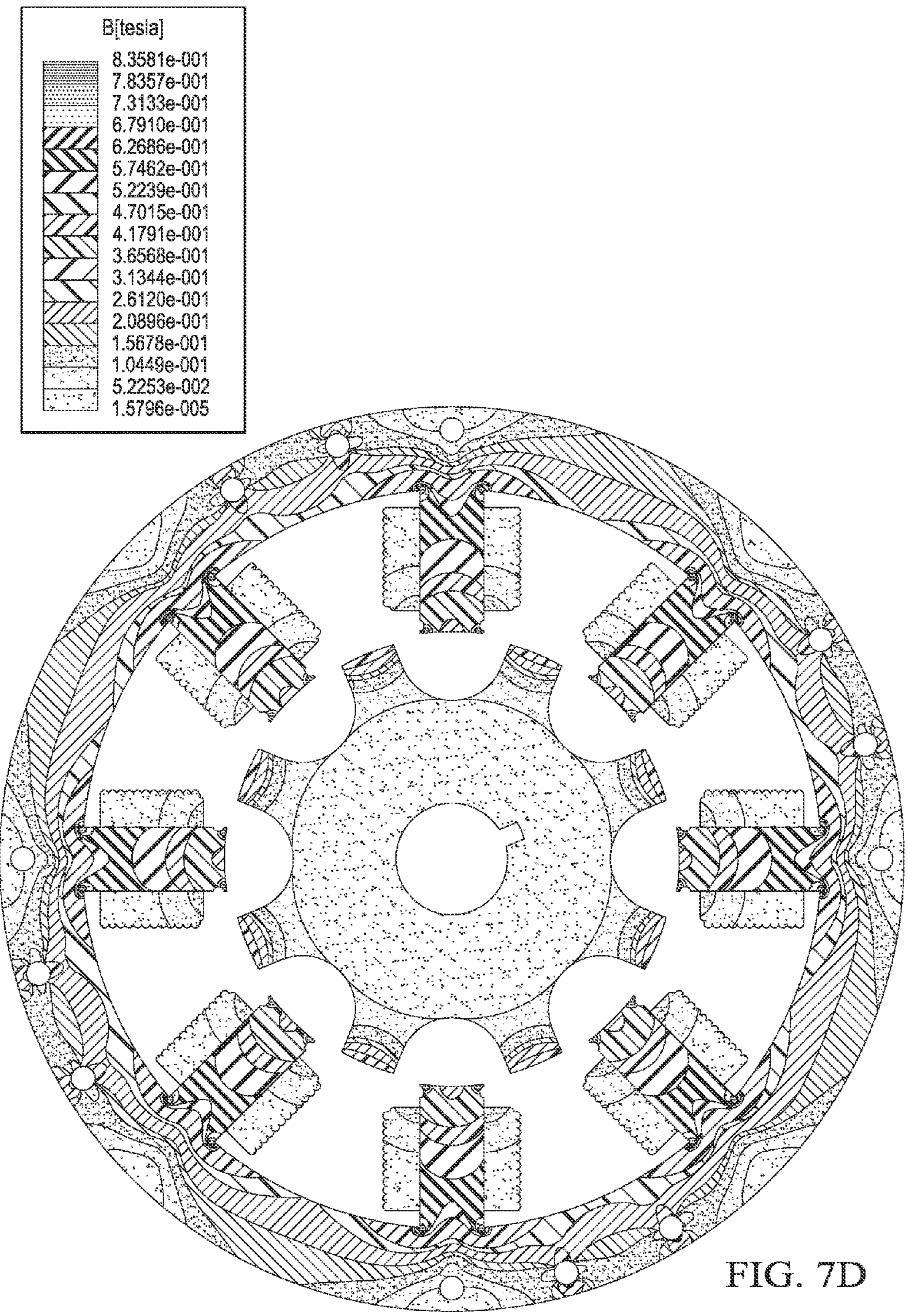

FIGS. 7B-7D illustrate flux density distribution for the machine of FIG. 1 at different rotor positions. The flux density diagrams were generated using a finite element analysis methodology known to those skilled in the art, and show that the magnetic flux during phase actuation is constrained to short flux paths (see FIG. 7A) and that minimal flux is present at the rotor core. Only short flux paths are provided with respect to operation of this machine. This results in an improvement in efficiency and reduction in noise.

Figure 8:
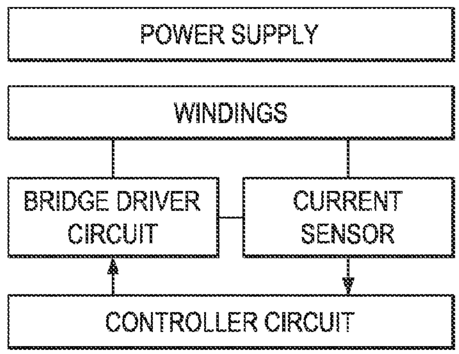
FIG. 8 illustrates a block diagram of a switched reluctance machine control circuit.

Reference is now made to FIG. 8. The control circuitry for the motor is of conventional design known to those skilled in the art. The controller circuit may, for example, comprise a digital signal processor (DSP) programmed to implement drive control. A bridge driver circuit is provided to drive the motor windings. The bridge driver circuit may comprise an asymmetric-bridge or full bridge configuration. The driver transistors within the bridge driver circuit receive gate control signals output from the controller circuit DSP. A current sensor is coupled to the motor windings to sense current passing through the motor windings and provide the sensed current information to the controller circuit DSP. The sensed current information is evaluated during the motoring phase of operation and used to determine when to actuate the driver transistors within the bridge driver circuit. A hysteresis control algorithm may be used during the motoring phase. An idle phase will be used for detection of the commutation instants. This is accomplished by energizing the idle phase of the stator with a series of high frequency voltage pulses. The main converter is used for this purpose. By precise monitoring of the diagnostic current, one can detect the commutation instant for the motoring mode of operation. It is important to note that the magnitude of the sensed diagnostic current depends inversely on the inductance and thereby introducing a one-on-one corresponding between the rotor position and the magnitude of the diagnostic current.

Figure 12A:
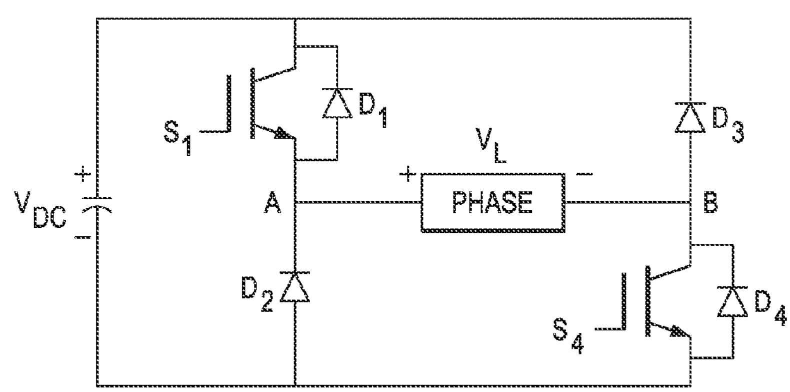
FIGS. 12A-12D illustrate different drive circuit topologies and operations.
Figure 12B:
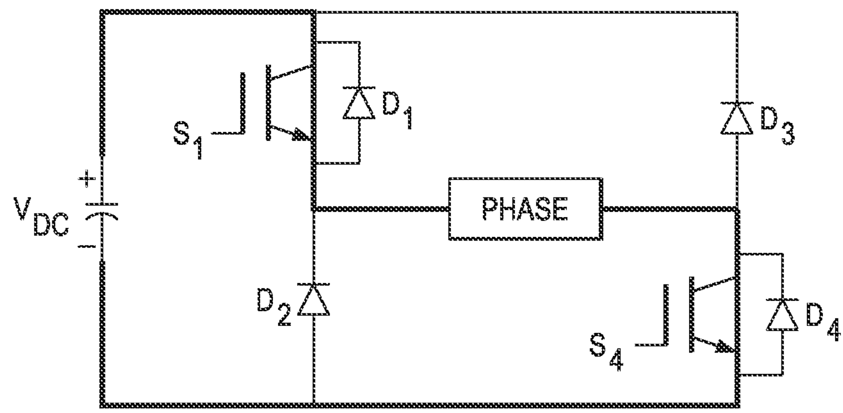
Figure 12C:
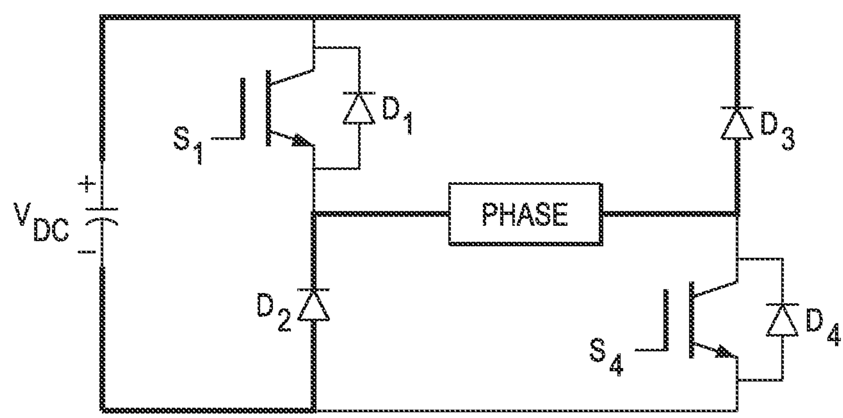
Figure 12D:
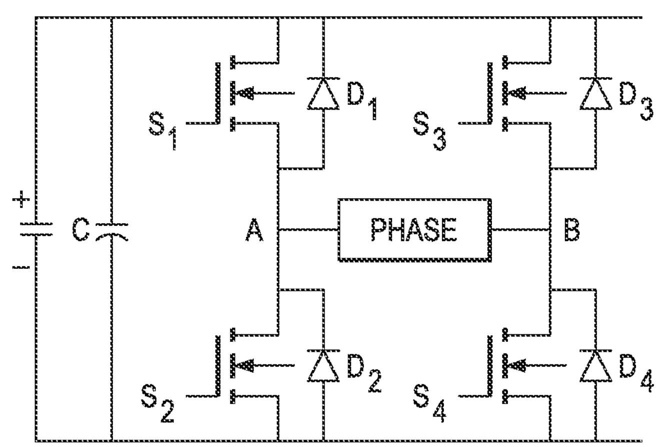

The bridge driver circuit may comprise an asymmetric-bridge (see FIGS. 12A-12C, where, FIG. 12B shows the current path when the switches are actuated and FIG. 12C shows the current path when the switches are deactivated) or full bridge (see, FIG. 12D, where the current paths depend on which pairs of switches are actuated) coupled to all the windings of the machine through nodes A and B. Alternatively, separate asymmetric-bridge or full bridge circuits could be used for groups of windings 60.

The bridge driver circuitry will preferably comprise a separate bridge driver circuit(s) for each single phase machine in the stack so as to exercise separate phase control over the operation of each individual machine.

With reference again to FIG. 1, it will be noted that a certain current flow is preferred with respect to the windings 60. The direction of axial current flow through a gap 200 between adjacent stator poles is always the same. By this it is meant that with respect to a given gap 200, the current flow in a winding for one stator pole and the current flow in a winding for the adjacent stator pole have a same axial direction). Thus, each gap 200 is associated with two windings, and the windings support axial current flow through the gap during single phase actuation that will have the same "x" or "•" nomenclature.

This is accomplished by ensuring the windings are properly installed at each stator pole, and then an asymmetric-bridge driver may be easily used. Alternatively, full bridge driver could be used with the appropriate gate signals used to control the direction of current in each one (or more than one) winding so as to ensure that the same axial current direction is present in each gap 200 between adjacent stator poles.

Figure 9:
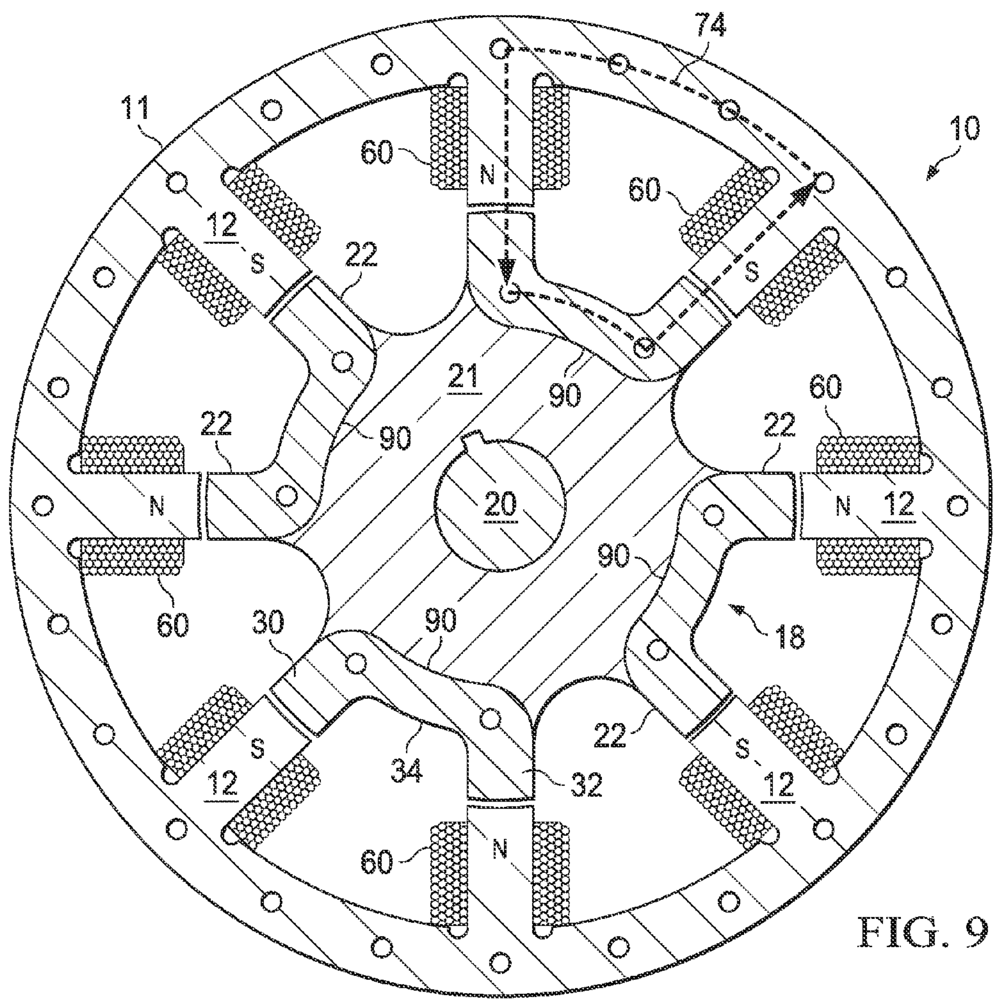
FIG. 9 illustrates an alternative embodiment for the rotor along with its associated flux path'

Reference is now made to FIG. 9 which illustrates an alternative embodiment. The embodiment of FIG. 9 is similar to that shown in FIG. 1. FIG. 9 differs from FIG. 1 in the implementation of the rotor poles. The rotor poles 22 in FIG. 9 are defined in sets of pole pairs 90. Each pair 90 of rotor poles is configured by a separate set of laminations. The separate laminations assist in constraining the flux path 74 to the described short flux path, and in particular restrain the flux path between rotor poles in the rotor to run circumferentially (rather than radially).

Thus, each circumferentially adjacent pair of rotor poles 22 is formed of a plurality of U-shaped metal laminations. One leg 30 of the U-shape defines a first of the rotor poles of the adjacent pair and the other leg 32 of the U-shape defines a second of the rotor poles of the adjacent pair. The bridge 34 between the legs 30 and 32 of the U-shape defines a part of the rotor ring 21 of the single phase switched reluctance machine. It will be noted that the laminations for the rotor pole pair 90 extend in a plane that is perpendicular to the axis of rotor rotation. The configuration of the laminations for each pole pair 90 serves to restrain the flux path 74 to pass in the rotor ring 21 only between circumferentially adjacent rotor poles 22.

With reference to an exemplary three stack switched reluctance machine, Table 1 presents a summary of the machine parameters:

| Parameter | Unit | Value |
|---|---|---|
| Outer diameter | in | 4.5 |
| Number of iron core stack segments | — | 3 |
| Angle shift between stacks | degree | 15 |
| Each Iron core Stack length | in | 1 |
| Overall length including end winding | in | 3 * (1 + 1.2) = 6.6 |
| Air gap length | mm | 0.5 |
| Lamination material | | M19G26 |
| Average torque | Nm | 8.1 |
| Base speed | rpm | 3600 |
| Peak current (one stack) | A | 21.4 |
| Peak current (each winding) | A | 10.7 |

This three stack single phase SRM is configured to produce 2.1 kW at 3600 rpm.

The proposed winding configuration for such a machine is presented in Table 2 (using the FIG. 4A schematic):

| Parameter | Unit | Value |
|---|---|---|
| Peak current of each winding | A | 10.7 |
| Peak current of each phase stack | A | 21.4 |
| Wire gauge for the windings | | 3 AWG 20 parallel |
| Number of turns for each winding | turns | 85 |
| Winding connections | | 4 serial, 2 parallel |

This presents a current density of 5 A/mm$^2$ and a filling factor of 0.7.

The wire for each winding is preferably of the format of three AWG20 paralleled or equivalent. It is preferred to have a few smaller diameter wires forming one conductor for the purpose of reducing the resistance at high frequency due to skin effect.

Although a multi-stack SRM configuration is preferred, it will be understood that the machine can be implemented with only a single stack if desired. Without a multi-stack configuration, the machine produces the same torque/power with the same outer diameter but with a shorter overall length.

Table 3 presents a summary of the single stack machine parameters:

| Parameter | Unit | Value |
|---|---|---|
| Outer diameter | In | 4.5 |
| Number of iron core stack segments | — | 1 |
| Iron core Stack length | in | 3 |
| Overall length including stack and end winding | in | 3 + 1.2 = 4.2 |
| Air gap length | mm | 0.5 |
| Lamination material | | M19G26 |
| Average torque | Nm | 8.1 |
| Base speed | rpm | 3600 |
| Peak current (one stack) | A | 16.25 |
| Peak current (each winding) | A | 65 |
| Current density | A/mm2 | 5 |
| Slot filling factor | | 0.7 |

Geometry of the stator laminations and rotor laminations for the single stack machine are the same as with the multi-stack machine. The main difference is that the single stack machine has only one three inch stack while the multi-stack machine has three one inch stacks (separated by spacer rings). The windings in the two machines are also different in order to accommodate different voltage supplies. Table 4 presents the proposed winding configuration (using the FIG. 4B schematic):

| Parameter | Unit | Value |
|---|---|---|
| Peak current of each winding | A | 16.25 |
| Peak current of phase | A | 65 |
| Wire gauge for the windings | | 4AWG 19 parallel |
| Number of turns for each winding | turns | 57 |
| Winding connections | | 4 parallel, 2 serial |

Figure 10:
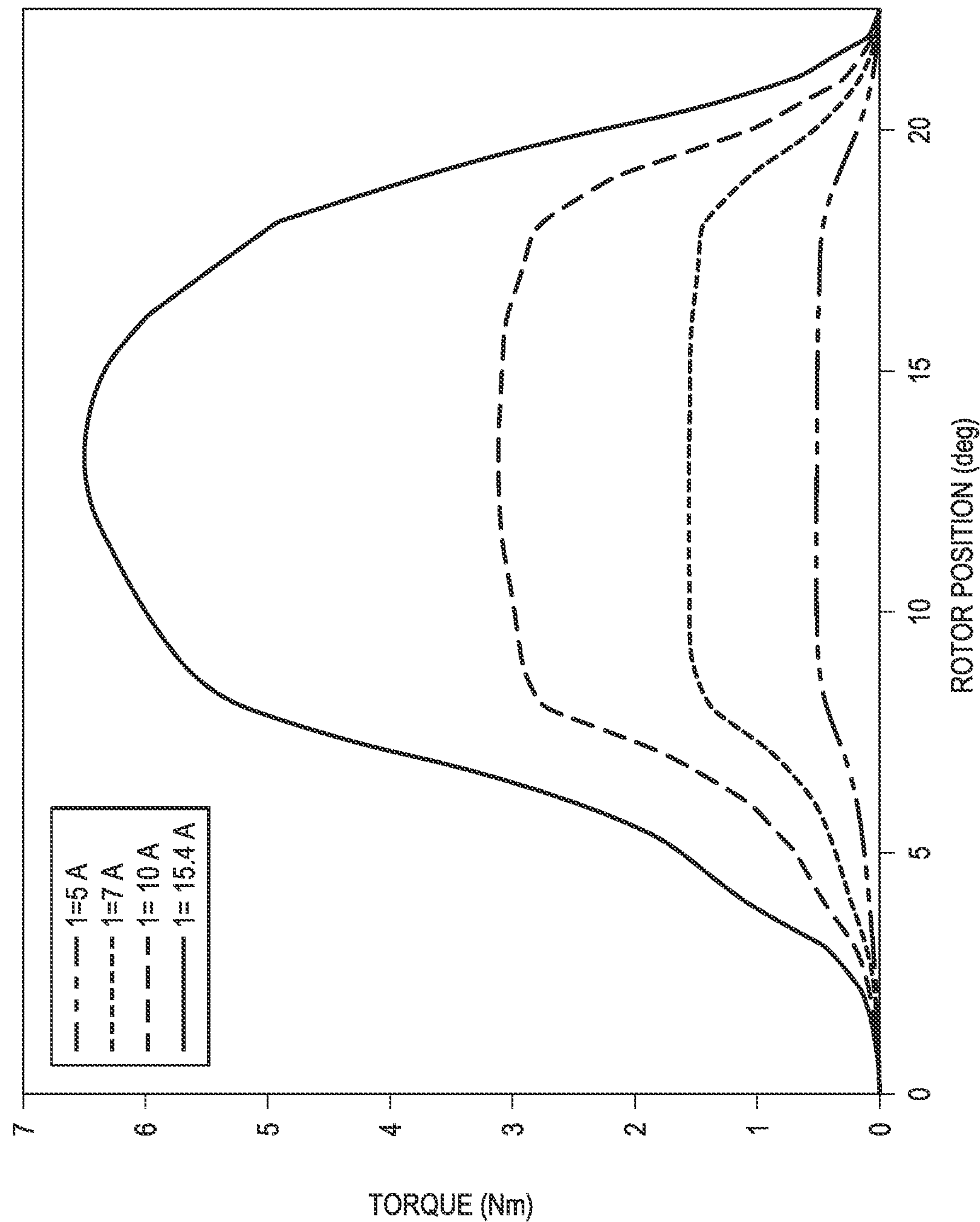
FIG. 10 illustrates a torque profile.
Figure 11:
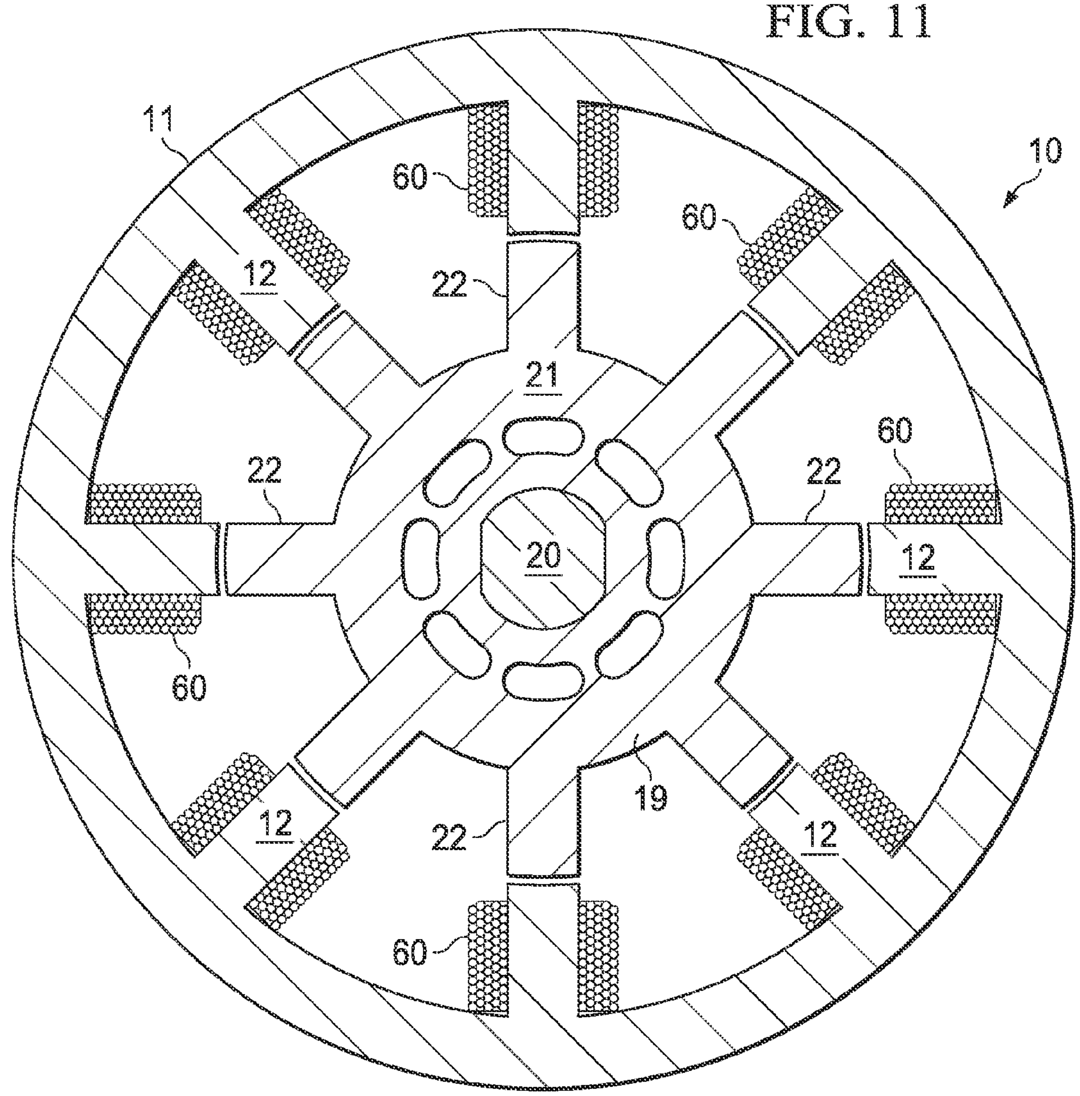
FIG. 11 illustrates an alternative embodiment for a single phase switched reluctance machine.

The torque profile for the machine is shown in FIG. 10. The torque profile is provided for different values of current. Torque is generated between 0 and 22.5 degrees of rotor pole angle and no toprw FIG. 11 illustrates another implementation of the machine showing provision on the rotor 18 of the rotor poles 22, support structure 19 and rotor ring 21. This implementation is preferably a laminated structure. Openings formed in the support structure 19 serve to reduce weight while the rotor ring supports the short flux path 74.

A machine of the type shown in FIG. 1 was built and tested with the following results:

Experimental results for different speed are listed in Table 5. It is seen that at 500 rpm the torque is 5.34 Nm for 14.6 A which validates the FE calculation showing 5.6 Nm for 15.4 Nm. At 3000 rpm because of a low current value motor could not produce enough torque. This is because of load characteristics in Lab which could not provide a smooth adjustable load. At 3600 rpm, because of a large back-emf the rising and falling time of current is large and then the rms current becomes lower than what it should be. Therefore, the motor torque would be lower than simulation. In this case the maximum value of current has to be increased, while keeping rms current in the safe region, to get enough torque.

| Speed (rpm) | Torque (Nm) | Current (A) | Output power (W) | Efficiency |
|---|---|---|---|---|
| 500 | 5.34 | 14.6 | 279.8 | 0.73 |
| 1000 | 5.65 | 15.2 | 592.4 | 0.80 |
| 2000 | 5.39 | 14.8 | 1129.6 | 0.91 |
| 3000 | 4.61 | 13.6 | 1449.4 | 0.89 |
| 3600 | 5.21 | 15.3 | 1965 | 0.88 |

Results of measured acoustic power are summarized in Table 6 and Table 7 below. Table 6 illustrates the measurement of acoustic power (for various motor speeds) at 1 kHz to 2.5 kHz.

| | |
|---|---|
| 500 rpm | 51.1 dB (A) |
| 1000 rpm | 59.9 dB (A) |
| 2000 rpm | 61.3 dB (A) |
| 3000 rpm | 71.2 dB (A) |
| 3600 rpm | 66.7 dB (A) |

Table 7 illustrates the measurement of acoustic power (for various motor speeds) at 10 kHz to 11 kHz.

| | |
|---|---|
| 500 rpm | 51.7 dB (A) |
| 1000 rpm | 56 dB (A) |
| 2000 rpm | 55 dB (A) |
| 3000 rpm | 54.4 dB (A) |
| 3600 rpm | 52.9 dB (A) |

It is seen that the acoustic power in low and high frequency regions is in the same order but as the speed increases, low frequency noise becomes dominant. The motor produces noise with the power between 50 to 70 dBA at different speeds.

The machine as illustrated herein maintains a short flux path in the rotor and stator and avoids unnecessary magnetization of the core. This reduces core loss resulting in increased efficiencies and lower acoustic noise.

Figure 13:
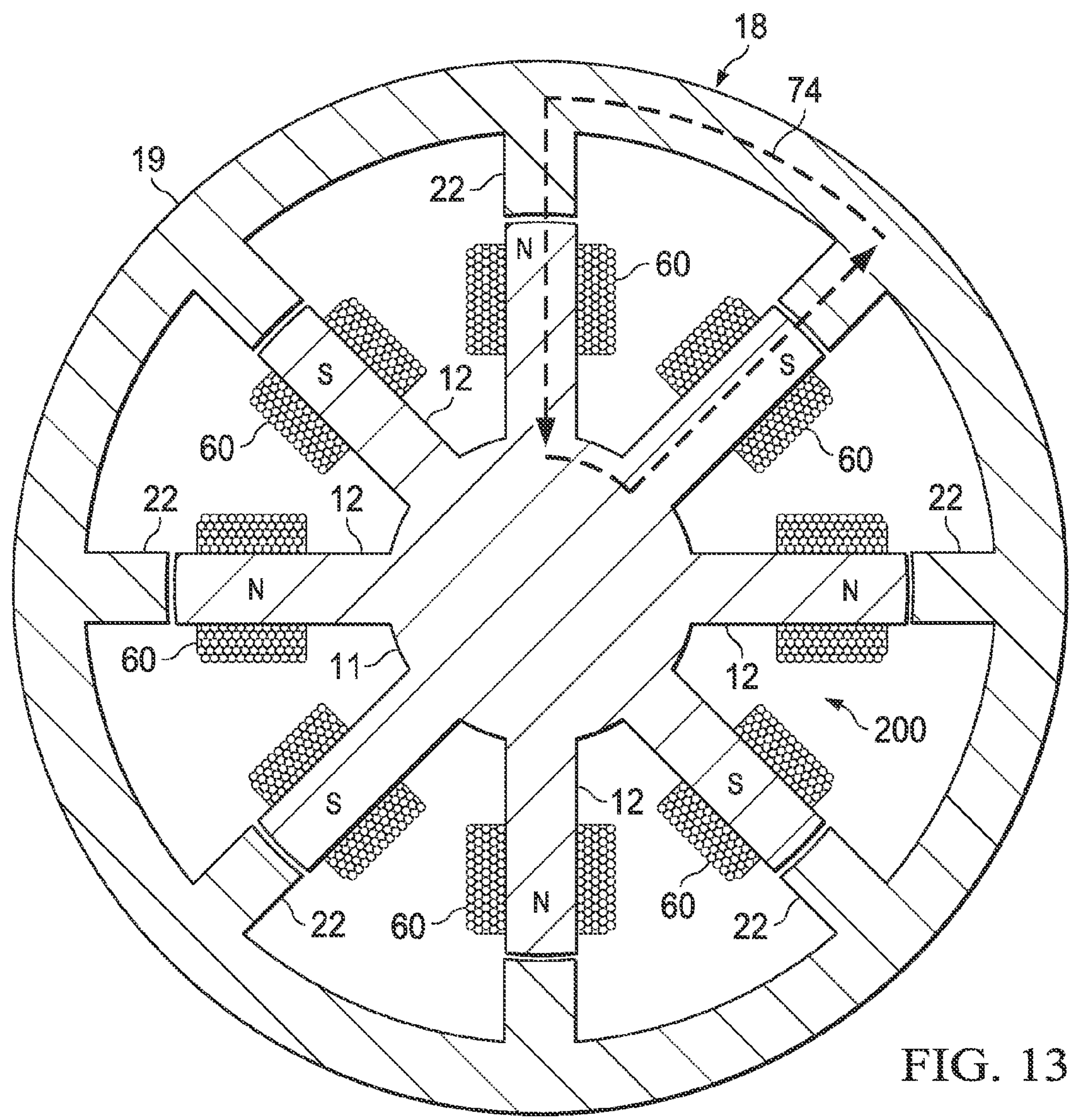
FIG. 13 illustrates an alternative embodiment for a single phase switched reluctance machine with an external rotor configuration.

Although the embodiments illustrated and described herein relate to a reluctance machine where the rotor is inside the stator, it will be understood that the disclosed reluctance machine could alternatively be configured with the stator inside the rotor as shown in FIG. 13. Operation of the outside rotor machine in FIG. 13 is identical to that of the inside rotor machine of FIG. 1 with a supported short flux path.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A reluctance machine, comprising:

a stator having N stator poles, each stator pole having a stator winding; and a rotor having N rotor poles and configured to rotate about an axis of rotation;

wherein the windings of the N stator poles are configured for excitation in a single phase; and wherein current in the windings for two circumferentially adjacent stator poles is controlled such that axial current flow in the windings through a gap between the two circumferentially adjacent stator poles during single phase excitation flows in a same axial direction.

2. The machine of claim 1, wherein the stator and rotor support a flux path traveling in a plane perpendicular to the axis of rotation that crosses two air gaps provided at corresponding pairs of rotor-stator poles that are circumferentially adjacent to each other.

3. The machine of claim 1, wherein the stator is formed of a plurality of laminations extending in a direction perpendicular to the axis of rotation and wherein the rotor is formed of a plurality of laminations extending in a direction perpendicular to the axis of rotation.

4. The machine of claim 1, wherein the stator is formed of a plurality of laminations extending in a direction perpendicular to the axis of rotation and wherein each pair of rotor poles for each circumferentially adjacent pair of rotor-stator poles is formed of a separate plurality of laminations extending in a direction perpendicular to the axis of rotation.

5. The machine of claim 1, wherein N is an even integer greater than or equal to 4.

6. The machine of claim 1, wherein the controlled current flow in the windings through the gap in the same axial direction is enforced by orientation of the windings on the adjacent stator poles carrying current during single phase excitation.

7. The machine of claim 1, wherein the controlled current flow in the windings through the gap in the same axial direction is enforced by controlling a switched direction of current applied to the windings on the adjacent stator poles during single phase excitation.

8. The machine of claim 2, wherein the rotor is configured to constrain the flux path to preclude radial flux propagation across the rotor to a diagonally opposite rotor pole.

9. The machine of claim 2, wherein rotor is configured to constrain the flux path solely to the two adjacent rotor poles corresponding to the two air gaps.

10. The machine of claim 1, wherein the rotor comprises a rotor ring and the plurality of rotor poles extend from said rotor ring.

11. The machine of claim 1, wherein the rotor is configured inside of the stator.

12. The machine of claim 1, wherein the stator is configured inside of the rotor.

13. The machine of claim 1, wherein the stator and rotor support N/2 separate flux paths, each of said separate flux paths traveling in a plane perpendicular to the axis of rotation and crossing only two air gaps provided at corresponding pairs of rotor-stator poles that are circumferentially adjacent to each other.

14. The machine of claim 13, wherein the rotor is configured to support separate flux path propagation only between circumferentially adjacent rotor poles.

15. The machine of claim 13, wherein each separate flux path travels radially along a first stator pole, crosses a first air gap to a first rotor pole, travels radially along that first rotor pole, then travels circumferentially in the rotor to a second rotor pole circumferentially adjacent the first rotor pole, travels radially along the second rotor pole, crosses a second air gap to a second stator pole circumferentially adjacent the first stator pole, travels radially along the second stator pole, and then travels circumferentially in the stator back to said first stator pole.

16. A reluctance machine, comprising:

a first single phase reluctance machine;

a second single phase reluctance machine stacked on said first single phase reluctance machine but angularly offset from said first single phase reluctance machine;

wherein each of the first and second single phase reluctance machines comprises:

a stator having N stator poles, each stator pole having a stator winding; and a rotor having N rotor poles and configured to rotate about an axis of rotation;

wherein the windings of the N stator poles are configured for excitation in a single phase; and wherein current in windings for two circumferentially adjacent stator poles is controlled such that axial current flow in the windings through a gap between the two circumferentially adjacent stator poles during single phase excitation flows in a same axial direction; and wherein the stator and rotor support N/2 separate flux paths, each of said separate flux paths traveling in a plane perpendicular to the axis of rotation and crossing only two air gaps provided at corresponding pairs of rotor-stator poles that are circumferentially adjacent to each other.

17. A reluctance machine, comprising:

a stator including a first stator pole and a circumferentially adjacent second stator pole;

a first stator winding for the first stator pole;

a second stator winding for the second stator pole;

wherein the first and second stator windings are electrically connected to be activated in a single phase;

a rotor including a first rotor pole and a circumferentially adjacent second rotor pole;

said stator and rotor supporting an isolated flux path that travels radially along the first stator pole, crosses a first air gap to the first rotor pole, travels radially along that first rotor pole, then travels circumferentially in the rotor to the second rotor pole, then travels radially along the second rotor pole, crosses a second air gap to the second stator pole, then travels radially along the second stator pole, and then travels circumferentially in the stator back to the first stator pole.

* * * * *